United States Patent [19]

Otsuki et al.

[11] 4,176,110

[45] Nov. 27, 1979

[54] ELECTROCOATING COMPOSITION FOR CATHODIC ELECTRODEPOSITIONS

[75] Inventors: Yutaka Otsuki, Yokohama; Yoshihiko Araki, Kawasaki; Kazuho Aoyama, Tokyo, all of Japan

[73] Assignee: Nippon Petroleum Company, Limited, Tokyo, Japan

[21] Appl. No.: 873,902

[22] Filed: Jan. 31, 1978

[30] Foreign Application Priority Data

Feb. 4, 1977 [JP] Japan .................................. 52-10803

[51] Int. Cl.$^2$ .......................... C08K 5/09; C08L 63/00
[52] U.S. Cl. ............................ 260/31.8 N; 260/42.21; 260/42.32; 260/42.47; 525/187
[58] Field of Search ........ 260/836, 837 R, 31.8–42.21, 260/42.32, 42.47

[56] References Cited

U.S. PATENT DOCUMENTS 4,025,578  5/1977  Siebert .................................. 260/836

FOREIGN PATENT DOCUMENTS 1102652  2/1968  United Kingdom .................... 526/52.2

Primary Examiner—J. Ziegler

[57] ABSTRACT

An improved electrocoating composition is described for cathodic electrodepositions, which composition comprises a water-miscible mixture of a substituted conjugated diene polymer or copolymer of a specific general formula, with not more than 30 parts by weight for 100 part of said diene of an epoxy resin, a petroleum resin or mixtures thereof, the mixture being neutralized with an acid.

12 Claims, No Drawings

ELECTROCOATING COMPOSITION FOR CATHODIC ELECTRODEPOSITIONS

FIELD OF THE INVENTION

The present invention relates to a cathode deposition type electrocoating composition which is excellent in wettability and affords a coated film excellent in impact-resistance, mechanical resistance and chemicals-resistance.

DESCRIPTION OF THE PRIOR ART

According to the prior art water-soluble paints, especially electrodeposition paints, are used as resin component resins possessing acid groups such as maleinized oils, maleinized polybutadiene and alkyl resin or acrylic resins containing acrylic acid or methacrylic acid as copolymeric component, which resins have been neutralized with a base such as ammonia, an amine or caustic potash to render them water-soluble.

These resins are dissociated in water to afford resins with anion. In electrodeposition operations, therefore, an article to be coated is used as anode and the resin with anion is then deposited on the anode to effect the coating.

However, in such anode deposition type electrocoating method wherein a metal to be coated is used as anode, a problem arises in that the metal to be coated is oxidized by the oxygen generated at the anode by electrolysis of water whereby a part of the metal is dissolved in water. As a part of the dissolved metal remains in the electrodeposited film, the coated article is contaminated and colored with such oxidized metal. In case an article to be coated is made of iron, for example, a white paint will be contaminated with iron ions and colored brown. In case an article to be coated is made of aluminum, for example, a white paint will be colored yellow. In addition, metal ions remaining in the coated film cause serious reduction in corrosion-resistance of the film. The paint solution is also contaminated with the metal ions, thus resulting in serious reduction in stability of the electrocoating bath.

The above mentioned problem of dissolution and contamination also arises in the event that a metal to be coated has been treated with a phosphate for preventing rust. Furthermore, a phosphate film once formed on the metal is dissolved, thus resulting in considerable reduction in rust-preventing effect. In general, the film of a paint of this type is not satisfactory in alkali-resisting property.

If electrodeposition can be effected with an article to be coated as cathode, dissolution of a metal or a surface-treated film from the article will no longer take place, affording an electrodeposited film free from coloration with dissolved metal ions and excellent in corrosion-resistance. In the cathode deposition type electrocoating method, various additional advantages can be expected. For example, electrodeposition can be applied also to metals which tend to dissolve in water and thus are unsuited for electrodeposition when treated according to the anode deposition type electrocoating method.

For carrying out the cathode deposition type electrocoating method, it is necessary to use a water-soluble resin which is capable of forming a cationic resin in water and being deposited on a cathode.

Hitherto, various researches have been made in this art for developing the process for producing the water-soluble resins which are capable of being deposited on a cathode, and as a result, modified epoxy resins (Japanese Patent Publns. Nos. 23807/74 and 31736/74) and modified acrylic resins obtained by radical-copolymerization of an acrylic monomer having a tertiary amine group such as one represented by the formula:

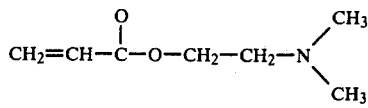

with various acrylic monomers or other monomers (Japanese Patent Publns. Nos. 37147/73, 12396/70, 12395/73 and 39351/70) have been proposed.

In the known conventional cathode deposition type electrocoating paints using the above resins, however, there are many drawbacks including too high curing temperatures and poor crosslinking densities. Thus, these known paints have not yet been put into practice on industrial scale.

In general, the film of a water-soluble paint tends to dissolve in water unless the film be modified. Thus, the film has to be cured by crosslinking according to a certain chemical means. After application of the paint, curing of the resultant film should satisfactorily be effected by a baking treatment usually conducted at 150°–200° C. for about 30 minutes. In the prior art, a method wherein a melamine formaldehyde resin or phenol formaldehyde resin is mixed or preliminarily condensed with the paint, or a method wherein the paint is modified with a drying oil was adopted to satisfy the above requirement. However, neither of such methods is suitable for resins for cathode deposition type electrocoating paints because the resins free from said group are not satisfactorily cured even in the presence of the mixed melamine formaldehyde resin or phenol formaldehyde resin nor fully cooperated therewith in electrophoresis to permit undesirable fluctuation in the composition of the film.

Even if a water-soluble basic resin can be synthetized and deposited on the cathode in the electrocoating operation, such resin is of a low value in practical use for electrodeposition unless it can be deposited in good state and the resultant coated film can exhibit good film characteristics. Stability of the paint should be good even at a low concentration when diluted or in a paint solution before dilution or during storage or running.

As a result of extensive researches made to overcome the above disadvantages in the prior art, the present inventors already invented a coating composition useful for a cathode deposition type electrocoating paint which is excellent in curability and stability during storage and capable of affording a corrosion-resisting film excellent in resistance to external mechanical force such as impact or bending and in chemicals-resistance such as alkali-resistance, water-resistance or solvent-resistance, by neutralizing a polymer or copolymer containing basic groups of the general formula:

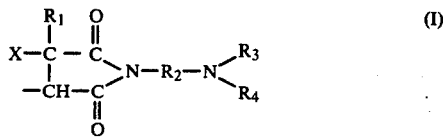

(I)

wherein $R_1$ stands for a hydrogen atom, a halogen atom or an organic residue with 1-3 carbon atoms; $R_2$ and $R_3$ may be the same or different and each stands for an organic residue with 1-20 carbon atoms; $R_4$ stands for a hydrogen atom or an organic residue with 1-20 carbon atoms; and X for a hydrogen atom or a bond with the proviso that when X stands for the bond, the carbon atom to which $R_1$ is attached and the carbon atom adjacent to said carbon atom and carrying the hydrogen atom may form a part of the main chain, with an organic or inorganic acid and then dispersing or dissolving the neutralized polymer or polymer in water (Japanese Patent Applns. Nos. 44802/75 and 138406/76). This electrocoating paint affords the above mentioned excellent film characteristics but is still unsatisfactory in wettability, one of the important characteristics of the electrocoating paints, which warrants complete application of the paint to complicated parts or invisible hidden parts of an article to be coated.

In electrodeposition operations, wettability is a very important requirement for improving the rust-preventing property of a whole article to be coated.

BRIEF SUMMARY OF THE INVENTION

As a result of further extensive researches made to improve wettability of the cathode deposition type electrocoating paint without damaging the excellent film characteristics thereof, the present inventors have accomplished the present invention.

It is an object of the present invention to provide a cathode deposition type electrocoating paint which is excellent in curability, applicability such as wettability and stability during storage and capable of affording a coated film excellent in resistance to external mechanical force such as impact and in chemicals-resistance such as alkali-resistance, water-resistance, solvent-resistance or corrosion-resistance.

The above object of the present invention can be attained by neutralizing a mixture of (A) 100 parts by weight of a substituted conjugated diene polymer or copolymer having a number average molecular weight of 300-5000 and containing basic groups of the general formula:

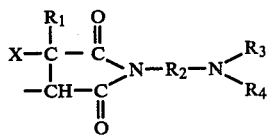

wherein $R_1$, $R_2$, $R_3$, $R_4$ and X have the same meanings as given above, and (B) one or more resins selected from epoxy resin in an amount not greater than 30 parts by weight and petroleum resins with a softening point of 80°-180° C. in an amount not greater than 30 parts by weight with an organic or inorganic acid and dispersing or dissolving the neutralized product into or in water.

The conjugated diene polymer or copolymer containing the above specific basic groups which is used in the present invention is synthetized by the imidation reaction between a butadiene homopolymer or copolymer having succinic acid group or acid groups derived from maleic acid or its anhydride and a diamine of the general formula:

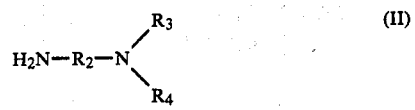

wherein $R_2$ and $R_3$ may be the same or different and each stands for an organic residue with 1-20 (preferably 1-4) carbon atoms and $R_4$ stands for a hydrogen atom or an organic residue with 1-20 (preferably 1-4) carbon atoms.

The conjugated diene polymer or copolymer having a molecular weight of 300-5000 which is used in the present invention as a starting material is produced according to a method known per se. For example, a typical method comprises subjecting one or more conjugated dienes or preferably a conjugated diene, especially butadiene or isoprene together with an aromatic vinyl monomer such as styrene, α-methylstyrene, vinyltoluene or divinylbenzene in an amount not greater than 50 mol % based on the conjugated diene to anionic polymerization conducted at 0°-100° C. in the presence of an alkali metal an organoalkali metal compound as a catalyst. In this case, the chain transfer polymerization method wherein an organoalkali metal compound such as benzyl sodium is used as catalyst and a compound containing an alkaryl group such as toluene is used as chain transfer agent (U.S. Pat. No. 3,789,090), the living polymerization method wherein a polynuclear aromatic compound such as naphthalene in tetrahydrofuran solvent is used as activator and an alkali metal such as sodium is used as catalyst (Japanese Patent Publns. No. 17485/67 and 27432/68), or a polymerization method wherein the molecular weight of the polymer or copolymer is controlled by using an aromatic hydrocarbon such as toluene or xylene as solvent and a dispersion of a metal such as sodium as catalyst and adding an ether such as dioxane to the reaction system (Japanese Patent Publns. Nos. 7446/57, 1245/58 and 10188/59) are preferable for controlling the molecular weight to obtain a lightly colored low polymerization product poor in a gel content. A low polymer produced by the coordinated anionic polymerization method wherein an acetylacetonate of a metal belonging to Group VIII of the Periodic Table such as cobalt or nickel and an alkylaluminum halide are used as catalyst (Japanese Patent Publns. Nos. 507/70 and 30300/71) can also be used for the present invention.

The conjugated diene polymer or copolymer containing acid groups such as succinic acid groups which is the next starting material is produced according to a method known per se wherein maleic acid, maleic anhydride, citraconic acid or citraconic anhydride is added usually at a temperature of 100°-300° C. to the conjugated diene polymer or copolymer referred to above (Japanese Patent Publn. No. 11195/71). In the case of performing such addition reaction, a method wherein a phenylenediamine, a pyrogallol, a naphthol or the like is allowed to be present in the reaction system to prevent a gel-forming reaction (DT-OS P2 362 534) is preferably adopted. The amount of the acid to be added to the conjugated diene polymer or copolymer, such as maleic acid, maleic anhydride, citraconic acid or citraconic anhydride, is 0.05-0.5 mol, preferably 0.1-0.25 mol per 100 g of the polymer or copolymer.

If the amount of the acid is less than 0.05 mol per 100 g of the polymer or copolymer, water-solubility of a resin obtained by reacting the polymer or copolymer containing the acid groups with the diamine compound will become poor. On the other hand, if the amount of the acid is more than 0.5 mol, water-solubility of the resin will become so good that the coated film obtained from the paint using such resin will be poor in water-resistance and will be unsuited for practical use.

Illustrative of the diamine compound used in the present invention are, for example, diamine compounds (III) combining a structure of primary amine with that of secondary amine such as β-hydroxyethylaminoethylamine, β-hydroxyethylaminopropylamine, methylaminoethylamine, ethylaminoethylamine, methylaminopropylamine, ethylaminopropylamine and butylaminopropylamine and/or compounds (IV) combining a structure of primary amine with that of tertiary amine such as dimethylaminoethylamine, diethylaminoethylamine, dimethylaminopropylamine, diethylaminopropylamine and dibutylaminopropylamine.

In the present invention, the conjugated diene polymer or copolymer containing the acid groups is reacted with the diamine compound alone or as a mixture of at least two. This reaction is an imidation reaction between the succinic acid group and the primary amino group. The amount of the diamine compound used is preferably equimolar to the succinic acid groups in the conjugated diene polymer or copolymer containing the acid groups. However, it is possible to use the diamine compound in excess and to remove excess diamine compound by distillation after the reaction. In case a diamine compound (III) having structures of primary amine and secondary amine is used in mixture with a diamine compound (IV) combining a structure of primary amine with that of tertiary amine, the ratio of (IV)/(III)+(IV) is usually 0–90%, preferably 20–80% in terms of molar ratio. In the reaction of this type the molar ratio of the diamines consumed for the reaction and that of the diamines introduced are almost equal.

The imidation reaction between the conjugated diene polymer or copolymer containing the acid groups and the diamines is carried out at a temperature within the range of 50°–300° C., preferably 100°–200° C.

This imidation reaction can be carried out in the presence or absence of a solvent. When the conjugated diene polymer or copolymer containing the acid groups used for the imidation reaction has a low viscosity, the reaction is carried out preferably in the absence of a solvent. In the case of using a solvent for the reaction, any of the solvents miscible with the conjugated diene polymer or copolymer containing the acid groups, for example, hydrocarbons such as benzene, toluene, cyclohexane and xylene, alcohols such as butyl cellosolve and ethers such as ethyleneglycol diethyl ether can be used, but it is preferable to use a hydrophilic solvent such as butyl cellosolve for the imidation reaction and successively to perform the water-solubilizing reaction as will be referred to hereinafter.

By the term "epoxy resin" is meant herein a compound having at least two reactive α-epoxy groups in its molecule. In the present invention, an epoxy resin having a molecular weight of 300–3,000 and an epoxy equivalent of 150–3,500 is effectively used.

A typical one of the epoxy resins is obtained as a reaction product of an active hydrogen compound and epichlorohydrine. Examples of the active hydrogen compound include compounds having at least two phenolic hydroxy groups such as bisphenol A, novolac resin and derivatives thereof. Compounds having carboxyl groups or amino groups are also used as the active hydrogen compound.

In the present invention, an epoxy resin obtained by the reaction between bisphenol A and epichlorohydrin is most effectively used. Typical examples of this epoxy resin include Epikote (Shell Chemical) and Araldite (Ciba-Geigy).

In the present invention, the epoxy resin is used in an amount not greater than 30 parts by weight, preferably 5–25 parts by weight per 100 parts by weight of the conjugated diene polymer or copolymer containing the basic groups.

If the amount of the epoxy resin used is greater than 30 parts by weight per 100 parts by weight of the conjugated diene polymer or copolymer containing the basic groups, the surface of the coated film will become too bad in smoothness to be suitable for practical use.

By the term "petroleum resin" is meant herein a resin with a softening point of 80°–180° C. obtained by heat polymerization or catalytic polymerization of a fraction containing olefins and diolefins with 4.5–10 carbonatoms which has been formed as by-product in the production of lower olefins such as ethylene and propylene from petroleum by thermal cracking or steam cracking. Utilizable as a catalyst for the catalytic polymerization are Friedel-Crafts catalysts and radical-forming catalysts. Among the petroleum resins, those of aliphatic or aromatic hydrocarbon series are representative which are obtained by polymerizing in the presence of a Friedel-Crafts catalyst such as boron trifluoride, aluminum chloride or a complex thereof a fraction boiling at 20°–280° C. in a residuum formed on cracking petroleum. In addition, a resin obtained by polymerizing in the presence of a catalyst such as a Friedel-Crafts catalyst terpenes per se or those formed by heating a fraction containing $C_5$-diolefins in a residuum formed on cracking petroleum, a resin obtained by polymerizing under heat or by the aid of a radical catalyst a fraction containing cyclic $C_5$-diolefins such as cyclopentadiene and dicyclopentadiene and Diels-Alder addition reaction products thereof in a residuum formed on thermal cracking of petroleum, and a hydrogenated product of these resins in which a part or almost all of unsaturated bonds in the resin molecule has been hydrogenated can also be used as the petroleum resin referred to herein. Representative of these resins are, for example, Neopolymer (Nisseki Chemical, Japan), Mitsui Petrosine (Mitsui Petrochemical, Japan) and the like commercially available resins. The amount of the petroleum resin added is not greater than 30 parts by weight, preferably 5–25 parts by weight per 100 parts by weight of the conjugated diene polymer or copolymer containing the basic groups. If the amount of the petroleum resin is greater than 30 parts by weight, the electrocoating composition will become too bad in dispersibility into water to be useful for practical use.

The epoxy resin and the petroleum resin are very preferably used together respectively in an amount not greater than 30 parts by weight, desirably 5–25 parts by weight per 100 parts by weight of the conjugated diene polymer or copolymer containing the basic groups.

In the present invention, the conjugated diene polymer or copolymer containing the basic groups is mixed with the epoxy resin and/or the petroleum resin. The mixing treatment of these components may be carried out merely by mixing under heat but is preferably carried out by mixing in good solvent for these components. Most preferable as the solvent is an organic solvent which is soluble in water and capable of dissolving the mixture.

The mixture of the present invention is then rendered soluble in water. A method of neutralizing the mixture with an inorganic acid such as hydrochloric acid or sulfuric acid or a water-soluble organic acid such as formic acid, acetic acid or propionic acid in an amount of 0.2–1.0 molar equivalent to the secondary and tertiary amino groups in the mixture is suitably adopted for solubilizing the mixture.

On solubilizing the mixture of the present invention, an organic solvent which is soluble in water and capable of dissolving the individual polymer and resins and has two groups selected from a hydroxyl group, an ether group and a carbonyl group in the molecule, such as ethyl cellosolve, propyl cellosolve, butyl cellosolve, ethyleneglycol dimethyl ether, diethyleneglycol dimethyl ether, diacetone alcohol or 4-methoxy-4-methylpentanone-2, is preferably used in an amount of 10–100 g per 100 g of the mixture for the purposes of facilitating solubilization of the mixture into water, improving stability of an aqueous solution of the mixture and improving fluidity of the resins and smoothness of the coated film.

The present invention will now be illustrated in more detail by way of examples and comparative examples in which the tests for examining the physical properties of the coated films were performed in accordance with JIS-K-5400.

The electrocoating composition of the present invention may be incorporated with a proper pigment such as titania, red oxide or carbon black and a rust-preventing pigment such as strontium chromate.

The composition of the present invention may further be incorporated with a drier such as cobalt naphthenate or manganese naphthenate for the purposes of depressing the baking temperature after application of the composition and shortening the curing time.

Experiment 1

In a 30-liter autoclave were placed 1 mol of benzyl sodium, 14 mols of toluene and 15 liters of n-hexane in a nitrogen stream. After maintaining the temperature at 30° C., 10 liters of butadiene was introduced into the autoclave in 2 hours while maintaining the temperature of 30° C. Then, 200 ml of methanol was added to stop the polymerization reaction. To the reaction mixture was added 1 kg of clay and the whole was stirred vigorously and then filtered whereby a transparent solution of the polymer free from alkali was obtained. Unreacted butadiene, toluene and n-hexane were then removed by distillation from the polymer solution to synthetize polybutadiene (A) having a number average molecular weight of 800, an iodine value of 410 and a 1,2-bond content of 55%.

In a 2-liter autoclave were placed 1000 g of the polbutadiene (A), 212 g of maleic anhydride, 300 g of xylene and 2 g of Antigen 3C (trade name of N-phenyl-N'-isopropyl-p-phenylenediamine, prepared by Sumitomo Chemical, Japan). The mixture was reacted under nitrogen atmosphere at 190° C. for 8 hours. Unreacted maleic anhydride and xylene were distilled off under reduced pressure from the reaction mixture whereby a liquid maleinized polybutadiene (A') having an acid number of 100 was synthetized.

The most of the acid groups contained in the maleinized polybutadiene (A') is shown by the structure.

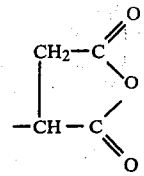

but a part of the acid groups was hydrolyzed with moisture in the air and changed to have the following structure:

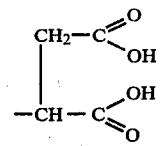

In a 2-liter separable flask were placed 1000 g of the maleinized polybutadiene (A'), 200 g of butyl cellosolve, 9.13 g of dimethylaminopropylamine and 92.9 of β-hydroxyethylaminoethylamine. The mixture was heated at 140° C. for 3 hours and then the water formed by the reaction, butyl cellosolve and unreacted amines were distilled off under reduced pressure whereby imidated polybutadiene (A") having the secondary amino group, the tertiary amino group and hydroxyl group was synthetized.

Then, 400 g of the imidated polybutadiene (A") was dissolved in 80 g of butyl cellosolve and neutralized with 18 g acetic acid whereby an aqueous solution having a solid concentration of 30% was prepared.

In a 2-liter stainless steel beaker were placed 600 g of the 30% aqueous solution, 774 g of titania, 24 g of carbon black and 1000 g of glass beads. The mixture was stirred vigorously for 2 hours with a high speed rotating mixture and then the glass beads were filtered off whereby a pigment paste (A) excellent in dispersibility into water was produced.

EXAMPLE 1

Into a 30-liter autoclave were charged 1 mol of benzyl sodium, 6 mols of toluene and 15 liters of benzene in nitrogen atmosphere. After maintaining the temperature at 30° C., 10 liters of butadiene was introduced into the autoclave in 4 hours while maintaining the temperature at 30° C. After decomposing the catalyst with water, the residue of the catalyst was removed by washing with water. Then, toluene, benzene and unreacted butadiene were removed by distillation whereby polybutadiene (B) having a number average molecular weight of 1400, an iodine value of 430 and a 1,2-bond content of 64% was synthetized.

In a 2-liter separable flask were placed 1000 g of the polybutadiene (B), 212g of maleic anhydride, 10 g of xylene and 2 g of Antigen 3C. The mixture was reacted in nitrogen atmosphere at 200° C. for 5 hours and then xylene and unreacted maleic anhydride were distilled off under subatmospheric pressure to synthetize maleimized polybutadiene (B') having an acid number of 100 and a viscosity of 25,000 poise (25° C.). In the same manner as described in Experiment 1 concerning the method for synthetizing imidated polybutadiene, the maleinized polybutadiene (B') was treated to synthetize imidated polybutadiene (B"). In a 2-liter separable flask were placed 100 g of the imidated polybutadiene (B"), 20 g of Epikote 1004 (an epoxy resin derived from bisphenol A, Shell Chemical) and 24 g of butyl cellosolve. The mixture was well stirred and dissolved in aqueous acetic acid to prepare a 20% aqueous solution of the mixture. To this aqueous solution was added 75.7 g of the pigment paste (A) produced in Experiment 1. The mixture was well mixed and diluted with pure water to prepare an electro-deposition coating liquid having a solid concentration of 12%.

This electrodeposition coating liquid was placed in 1-liter beaker and a solid component was electrodeposited as a film on a mild steel panel as cathode which had been treated with Bondelite #137 (Nippon Test Panel Co., Japan), using a carbon plate electrode as anode. The result of this test is shown in Table 1.

EXAMPLE 2

In a 2-liter separable flask were placed 100 g of the imidated polybutadiene (B") produced in Example 1, 20 g of a petroleum resin (Nisseki Neopolymer #120 having a softening point of 120° C., Nisseki Chemical, Japan) and 24 g of butyl cellosolve. The mixture was well stirred and then dissolved in aqueous acetic acid to form a 20% aqueous solution of the mixture. To this aqueous solution was added 75.7 g of the pigment paste (A) produced in Experiment 1. The mixture was well mixed and diluted by addition of pure water to prepare an electrodeposition coating liquid having a solid concentration of 12%.

This electrodeposition coating liquid was placed in a 1-liter beaker and a solid component of the liquid was electrodeposited as a film on a mild steel panel as cathode which had been treated with Bondelite 190 137 (Nippon Test Panel Co., Japan), using a carbon plate electrode as anode. The result of this test is shown in Table 1.

EXAMPLE 3

In a 2-liter separable flask were placed 100 g of the imidated polybutadiene (B") produced in Example 1, 10 g of an epoxy resin (Epikote 1004), 10 g of a petroleum resin (NP 120) and 24 g of butyl cellosolve. The mixture was well stirred and then dissolved is aqueous acetic acid to form a 20% aqueous solution of the mixture. To this aqueous solution was added 75.7 g of the pigment paste (A) produced in Experiment 1. The mixture was well mixed and then diluted by addition of pure water to prepare an electrodeposition coating liquid having a solid concentration of 12%.

This electrodeposition coating liquid was placed in a 1-liter beaker and a solid component of the liquid was electrodeposited as a film on a mild steel panel as cathode treated with Bondelite 190 137 (Nippon Test Panel Co., Japan), using a carbon plate electrode as anode. The result of this test is shown in Table 1.

Comparative Example 1

In a 2-liter separable flask were placed 100 g of the imidated polybutadiene (B") produced in Example 2 and 20 g of butyl cellosolve. The mixture was well stirred and then dissolved in aqueous acetic acid to form a 20% aqueous solution of the mixture. To this aqueous solution was added 63.1 g of the pigment paste (A) produced in Experiment 1. The mixture was well mixed and then diluted by addition of pure water to prepare an electrodeposition coating liquid having a solid concentration of 12%.

This electrodeposition coating liquid was placed in a 1-liter beaker and a solid component of the liquid was electrodeposited as a film on a mild steel panel as cathode treated with Bondelite #137 (Nippon Test Panel Co., Japan), using a carbon plate electrode as anode. The result of this test is shown in Table 1.

A comparison of Examples 1, 2 and 3 with Comparative Example 1 in Table 1 clearly demonstrates that even in the case of using the same imidated polybutadiene (B") as starting material, addition of the petroleum resin or the epoxy resin derived from bisphenol A serves to improve wettability, especially addition of both the petroleum resin and the epoxy resin derived from bisphenol A as seen in Example 3 serves to improve not only wettability remarkably but also corrosion-resistance of the coated film. Thus, it is evident that a coated film with excellent physicochemical characteristics can be obtained according to the composition of this invention.

Table 1

| | Results of the tests made on the electrodeposition coating paints | | | |
|---|---|---|---|---|
| Test items | Example 1 | Example 2 | Example 3 | Comparative Example 1 |
| Coating conditions: | | | | |
| Voltage (V) | 100 | 75 | 250 | 45 |
| Time (min.) | 3 | 3 | 3 | 3 |
| Baking condition (°C. × min.) | 200 × 30 | 200 × 30 | 200 × 30 | 200 × 30 |
| Thickness of coated film (μ) | 20 | 20 | 20 | 20 |
| Physical tests: | | | | |
| Penical hardness | H-2H | HB-H | H-2H | HB-H |
| Sketching | Passed | Passed | Passed | Passed |
| Cross-cut adhesion test (tape test) | 100/100 | 100/100 | 100/100 | 100/100 |
| Erichsen (mm) | >9 | >9 | >9 | >9 |
| Impact strength (cm) Front[*1] | >50 | >50 | >50 | >50 |
| Impact strength (cm) Back | >50 | >50 | >50 | >50 |
| Wettability[*2] | 16 | 12 | 21 | 7 |
| Chemical tests: | | | | |
| Alkali resistance (hr)[*3] | 60 | 60 | >100 | >100 |
| Acid resistance (hr)[*4] | 60 | 50 | 60 | 60 |
| Solvent resistance (day)[*5] | >30 | >30 | >30 | >30 |
| Water resistance (day)[*6] | >30 | >30 | >30 | >30 |

Table 1-continued
Results of the tests made on the electrodeposition coating paints

| Test items | Example 1 | Example 2 | Example 3 | Comparative Example 1 |
|---|---|---|---|---|
| Corrosion resistance (mm)*[7] | 3 | 3 | 1 | 3 |

Remarks:
*[1]The maximum height of the extruded portion where the coated film is not destroyed (500g, ¼B)
*[2]In accordance with Ford test
*[3]The time elapsed until imperfections such as blistering were observed in the coated film (immersion in 5% NaOH).
*[4]The time elapsed until imperfections such as blistering were observed in the coated film (immersion in 5% $H_2SO_4$).
*[5]The time elapsed until imperfections such as blistering were observed in the coated film (immersion in pure water at 40° C.).
*[6]The time elapsed until imperfections such as blistering were observed in the coated film (immersion in a mixed solvent (1:1) of toluene and xylene).
*[7]The maximum rust width from a cut portion in the coated film (200 hours after spraying a 5% aqueous solution of NaCl).

What is claimed is:

1. An electrocoating composition for cathodic electrodepositions which comprises a water-miscible mixture composed of (A) a substituted conjugated diene polymer or copolymer having a molecular weight of 300-5000 and containing basic groups of the general formula:

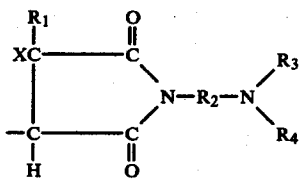

wherein $R_1$ is a hydrogen atom, a halogen atom or an organic residue with 1-3 carbon atoms; $R_2$ and $R_3$ are organic residues with 1-20 carbon atoms; $R_4$ is a hydrogen atom or an organic residue with 1-20 carbon atoms; and X is a hydrogen atom or a bond, and if X is a bond the carbon atom to which $R_1$ is attached and the carbon atom adjacent to said carbon atom and carrying the hydrogen atom may be part of the main chain, in a proportion of 0.05-0.5 moles per 100 grams of the said conjugated diene; and (B) not more than 30 parts by weight per 100 parts by weight of (A) of at least one resin selected from epoxy resins, said mixture of (A) and (B) being neutralized with an acid.

2. The electrocoating composition of claim 1, wherein said conjugated diene contains an acid selected from the group consisting of maleic acid, maleic anhydride, citraconic acid and citraconic anhydride, and is present in amounts of 0.05-0.5 mols per 100 grams of said diene.

3. The electrocoating composition of claim 2, wherein said acid is present in an amount of 0.1-0.25 mols per 100 grams of said diene.

4. The electrocoating composition of claim 1, wherein said epoxy resin contains at least two reactive alpha-epoxy groups in its molecule.

5. The electrocoating composition of claim 4, wherein said epoxy is a reaction product of an active hydrogen compound and epichlorohydrin.

6. The electrocoating composition of claim 5, wherein said hydrogen compound has at least two phenolic hydroxy groups.

7. The electrocoating composition of claim 1, wherein said epoxy resin is the reaction product between bisphenol A and epichlorohydrine.

8. The electrocoating composition of claim 1, wherein said component (B) of the mixture is present in an amount ranging from 5 to 25 parts by weight per 100 parts of the component (A).

9. The electrocoating composition of claim 1, wherein it is further comprising a pigment.

10. The electrocoating composition of claim 9, wherein said pigment is selected from the group consisting of titania, red oxide, carbon black and strontium chromate.

11. The electrocoating composition of claim 9, further comprising a drying substance selected from the group consisting of cobalt naphthenate and manganese naphthenate.

12. Process for preparing the electrocoating composition of claim 2, which comprises the steps of:
(a) providing a substituted conjugated diene polymer or copolymer having a molecular weight of 300-5000 and containing basic groups of the general formula:

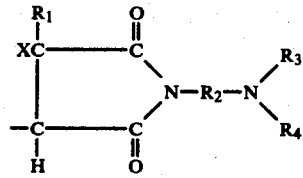

wherein $R_1$ is hydrogen, a halogen or an organic residue with 1-3 carbon atoms; $R_2$ and $R_3$ are organic residues with 1-20 carbon atoms; $R_4$ is hydrogen or an organic residue with 1-20 carbon atoms; and X is hydrogen or a bond, and if X is a bond the carbon atom to which $R_1$ is attached and the carbon atom adjacent to said carbon atom and carrying the hydrogen may form part of the main chain, in a proportion of 0.05-0.5 moles per 100 grams of the said diene;
(b) mixing said substituted conjugated diene with a resin selected from epoxy resins in a weight ratio of not more than 30 parts of resin to 100 parts of diene; and
(c) neutralizing the resulting mixture with an acid.

* * * * *